F. A. SMITH.
VENTILATOR ATTACHMENT FOR WIND SHIELDS.
APPLICATION FILED SEPT. 15, 1915.
1,223,119.
Patented Apr. 17, 1917.
2 SHEETS—SHEET 1.
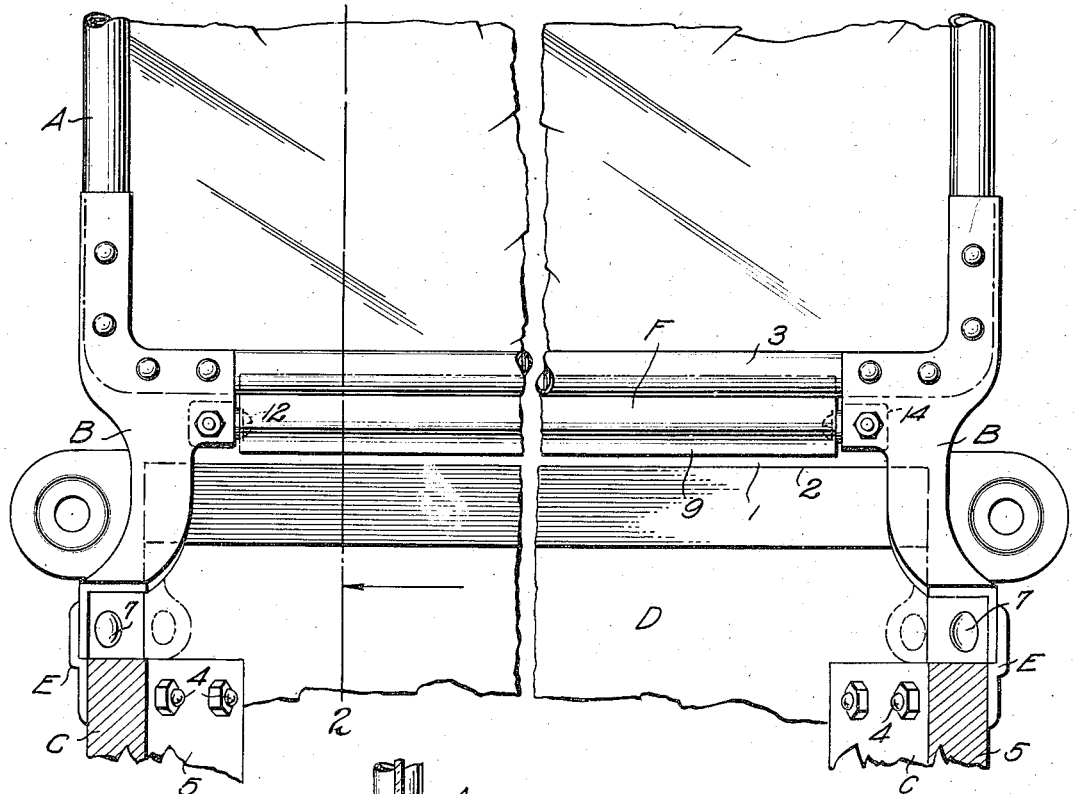
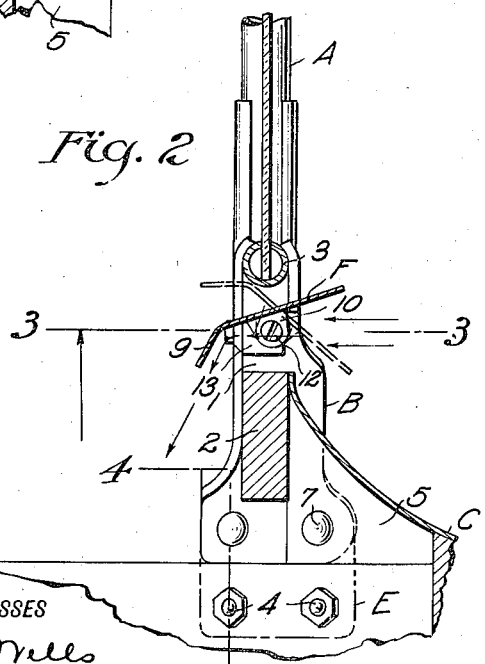
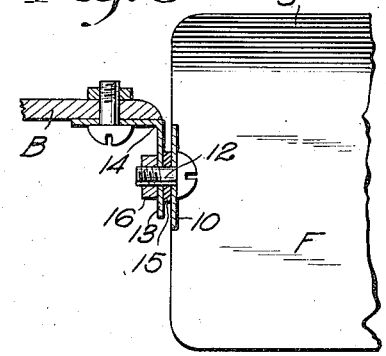
WITNESSES
INVENTOR
Frank A. Smith
BY
ATTORNEYS

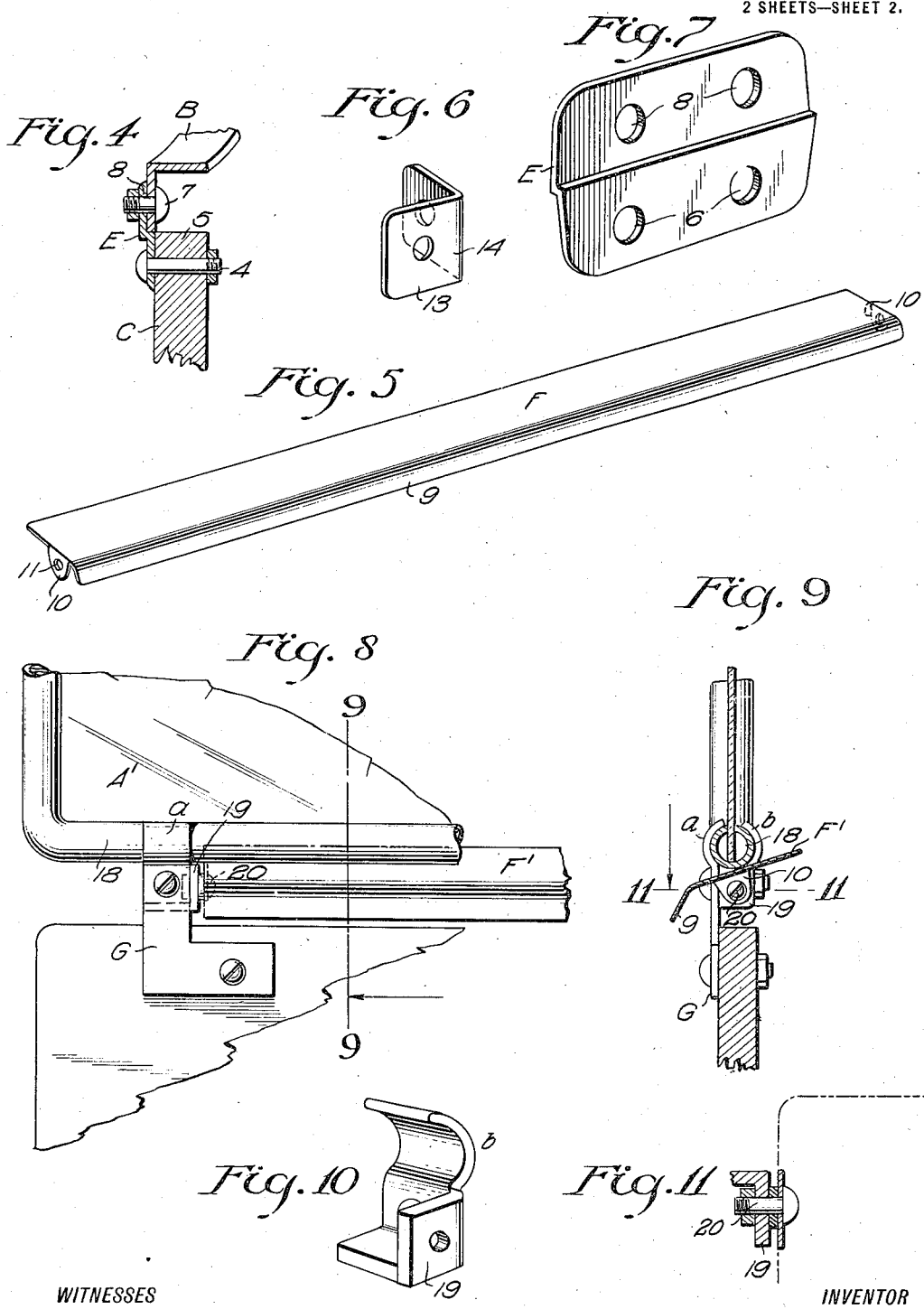

UNITED STATES PATENT OFFICE.

FRANK ASBURY SMITH, OF ORANGE, NEW JERSEY.

VENTILATOR ATTACHMENT FOR WIND-SHIELDS.

1,223,119.　　　　　Specification of Letters Patent.　　Patented Apr. 17, 1917.

Application filed September 15, 1915. Serial No. 50,741.

*To all whom it may concern:*

Be it known that I, FRANK A. SMITH, a citizen of the United States, and a resident of Orange, in the county of Essex and State of New Jersey, have invented a new and Improved Ventilator Attachment for Wind-Shields, of which the following is a full, clear, and exact description.

In certain types of automobiles excessive heating in warm weather occurs in the front part of the body between the dash and the front seat, which renders it unpleasant for the occupants. It is therefore desirable to provide means for causing a circulation of air in this space so as to keep the feet and limbs of the occupants of the front seat comfortably cool.

The general objects of the present invention are to provide a comparatively simple, inexpensive and efficient means for causing air to circulate around the feet of the occupants in the front seat while the car is in motion, this being accomplished by a ventilator which is positioned between the bottom of the wind shield and the top of the dash, so that air enters between the wind shield and dash and is directed downwardly behind the latter upon the feet of the occupants, and then rearwardly, upwardly and out of the car.

A further object of the invention is to provide a ventilator attachment of the character referred to which is capable of adjustment so that the ventilating air currents can be shut off and so that, in case of rain, the water running down the wind shield will be prevented from entering the opening between the wind shield and dash, since the ventilator when in closed position acts as a water shedding device.

Still another object of the invention is the provision of a ventilator which is capable of employment in connection with automobiles at present in use.

In the accompanying drawings, which illustrate certain embodiments of the invention and wherein similar characters of reference indicate corresponding parts in all the views, Figure 1 is a fragmentary rear view of a wind shield and dash with the ventilating attachment in position;

Fig. 2 is a vertical sectional view on the line 2—2, Fig. 1;

Fig. 3 is a detail sectional view on the line 3—3, Fig. 2, showing the means for mounting the adjustable ventilator vane;

Fig. 4 is a detail sectional view on the line 4—4, Fig. 2, to show the fitting for attaching the wind shield brackets to the vehicle body in such a position that a ventilator can be applied to the wind shield;

Fig. 5 is a perspective view of the vane or slat that forms the ventilator;

Fig. 6 is a perspective view of one of the angle or bearing brackets for the ventilator vane;

Fig. 7 is a perspective view of one of the adapters or fittings for attaching the wind shield brackets to the vehicle body;

Fig. 8 is a fragmentary view of a modified form of the invention for adapting the ventilator to wind shields fastened to the dash of the vehicle;

Fig. 9 is a detail sectional view on the line 9—9, Fig. 8;

Fig. 10 is a detail perspective view of the front member of a bracket that supports the wind shield and ventilator; and Fig. 11 is a sectional view on the line 11—11, Fig. 9.

Referring to the drawing, A designates a wind shield of standard construction which is fastened at its lower corners to brackets B, which are in turn fastened to the sides of the vehicle body C in such position that the wind shield will be directly over the dash D. In Figs. 1 and 2 the brackets B are shown somewhat raised from their original position so as to provide a horizontal opening 1 between the top 2 of the dash and the bottom 3 of the wind shield for the purpose of allowing air to enter to ventilate the front part of the car body. To support the brackets B in raised position, adapters or bracket plates E are provided which are fastened by bolts 4 to the sides 5 of the car body C, and these plates extend upwardly above the top edges of the sides 5, and the base portions of the brackets B are riveted thereto. The bolts 4 pass through the lower openings 6, Fig. 7, of the bracket plates E, and the bolts 7, Fig. 1, pass through the upper openings 8 of the bracket plates, as shown in Fig. 7, to secure the brackets in place.

To control the ventilating opening 1 a pivoted vane or slat F is arranged in the opening. This ventilator F is preferably a flat strip of metal having a downwardly bent lip 9 at its rear edge. On the ends of the strip are lugs 10 provided with apertures through which extend bolts 12 which are arranged in the same horizontal plane to form pivots on which the ventilator F can swing. The bolts 12 pass through the members 13 of angle brackets 14 which are bolted to the brackets B. Between the lugs 10 and bearing members 13 are spacing washers 15, and the nuts 16 of the bolts 12 are so tightened that the ventilator F is frictionally held in any position to which it is adjusted. By means of this ventilator or vane F air can be admitted to the car body through the opening 1, or it can be excluded. When the ventilator is in the full-line position, Fig. 2, a current of air is induced by the movement of the vehicle. This air is deflected downwardly by the lip 9 behind the dash and strikes the feet of the occupants and circulates around the limbs so as to increase the comfort of the riders. If this current of air is to be cut off the vane is adjusted to its other extreme position, as shown by dotted lines, so that no air can enter the opening 1. Also, in case of rain, the ventilator is adjusted to the dotted-line position, so that the rain will not enter the vehicle body through the ventilating opening.

In a certain type of car the wind shield is fastened to the dash by L-shaped brackets G, as shown in Figs. 8 and 9. Thése brackets are made in two parts *a* and *b*, so as to clamp the bottom bar 18 of the wind shield A'. When a ventilator is to be used the brackets B are longer than ordinarily, and the front sections *b* are provided with apertured lugs 19 for receiving the pivot bolts 20 by which the ventilator F' is mounted on the brackets.

When the ventilator is installed by the manufacturer of the cars, the brackets B will of course be made longer, so that the bracket plates E can be dispensed with.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. An attachment for a vehicle dash, comprising a wind shield, brackets rigidly fastened thereto, and a horizontally extending member pivoted at its ends on the brackets immediately adjacent the bottom of the wind shield to form a ventilator, the brackets extending downwardly below the member for attachment to the dash of the vehicle, said wind shield, bracket and member forming a unitary structure attachable to or detachable from the dash.

2. The combination of a vehicle dash, a wind shield, supporting brackets for the wind shield and holding the latter with its bottom spaced above the dash to provide a ventilating opening, a ventilator in the form of a vane disposed in the opening and having apertured lugs on its ends, apertured members on the brackets, and pivot bolts passing through the apertured lugs and members for frictionally holding the vane in different positions of adjustment, the front and rear edges of the vane being disposed respectively in front of and behind the plane of the wind shield, whereby the opening can be closed when the vane is in one position, the rear edge of the vane being bent into a downwardly inclined longitudinal lip for directing downwardly the air entering the opening.

In testimony whereof I have signed my name to this specification in the presence of two subscribing witnesses.

FRANK ASBURY SMITH.

Witnesses:
 HARRY A. TAYLOR,
 CHARLES H. TAYLOR.